United States Patent [19]

Zamer

[11] 3,932,561

[45] Jan. 13, 1976

[54] ADHESIVES COMPRISING SOLUTIONS OF A MIXTURE OF A TERPENE URETHANE RESIN WITH THERMOPLASTIC POLYETHER POLYURETHANES CONTAINING TERTIARY AMINE GROUP

[75] Inventor: Joseph Zamer, Paramus, N.J.

[73] Assignee: Inmont Corporation, New York, N.Y.

[22] Filed: Nov. 12, 1974

[21] Appl. No.: 523,086

Related U.S. Application Data

[62] Division of Ser. No. 396,237, Sept. 11, 1973, Pat. No. 3,887,755.

[52] U.S. Cl. ............... 260/858; 156/331; 260/24; 260/29.2 TN; 260/32.8 N; 260/77.5 AQ; 260/77.5 MA; 260/77.5 AP; 428/424; 428/428

[51] Int. Cl.$^2$ ............................. C08G 18/32
[58] Field of Search ........... 260/24, 858, 77.5 AQ, 77.5 MA, 260/77.5 AP

[56] References Cited

UNITED STATES PATENTS

| | | | |
|---|---|---|---|
| 3,718,712 | 2/1973 | Tushaus | 260/858 |
| 3,726,838 | 4/1973 | Eimer et al. | 260/75 NQ |

Primary Examiner—M. J. Welsh

[57] ABSTRACT

Adhesives for laminating saran film or saran coated surfaces to polypropylene or polyethylene films or surfaces are disclosed. The adhesives comprise solutions of a mixture of a terpene urethane resin with certain thermoplastic polyether polyurethanes.

6 Claims, No Drawings

ADHESIVES COMPRISING SOLUTIONS OF A MIXTURE OF A TERPENE URETHANE RESIN WITH THERMOPLASTIC POLYETHER POLYURETHANES CONTAINING TERTIARY AMINE GROUP

This is a division of application Ser. No. 396,237, filed Sept. 11, 1973, now U.S. Pat No. 3,887,755.

This invention relates to improved adhesives and laminates. More particularly the invention relates to improved adhesives that are especially suited for making laminates of saran films or saran coated films to treated polypropylene films. The adhesives are also suitable for laminating treated polypropylene surfaces to each other; also for laminating saran to saran, saran to treated polyethylene or to other saran films or surfaces, and to treated polyethylene to treated polyethylene. This invention also relates to methods of preparing the said laminates.

The packaging industry employs enormous quantities of film, foil and anglogous sheet-like structures for protecting foods from loss of moisture, from the oxidative effect of air or oxygen, from the deleterious effects of light, and for other reasons. Some of the most useful of these packaging films are laminates. Among the most useful laminates are those in which saran, or a saran coated substrate is laminated to a film or sheet of treated polyethylene or treated polypropylene, or laminates wherein treated polyethylene or treated polypropylene is laminated to another treated polyethylene or polypropylene surface. Saran is a generic name for a copolymer containing between about 25 and 95 weight percent polymerized vinylidene chloride with the remainder being any other monoethyleneically unsaturated monomeric material which is copolymerizable with vinylidene chloride. Treated polyethylene or polypropylene means polyethylene or polypropylene, foil, film, etc., which has been treated to provide a surface thereon which has better adhesion for inks, coatings and adhesives. Corona discharge treatment of the polyethylene or polypropylene surface is the method most frequently used; however other methods such as flame treatment and contacting the surface with chromic acid solution are reported in the prior art.

The prior art teaches the use of reactive urethane adhesives for laminating saran to saran, for laminating treated polyethylene to treated polyethylene and for laminating saran to treated polyethylene and polypropylene. Such prior art methods have the disadvantage that the adhesive comprises two components which have to be mixed immediately prior to application. Being reactive, the adhesive has a relatively short "pot life," i.e., the setting of the reactive adhesive becomes so advanced the viscosity build-up is so great that it becomes difficult to apply the adhesive to the substrate. A further disadvantage is that after application of the adhesive several hours are required for the ultimate bond to be formed by the curing or setting of the adhesive.

In accordance with the present invention the above enumerated disadvantages are overcome by employing an adhesive comprised of a mixture of thermoplastic water soluble polyurethane and a water insoluble thermoplastic terpene urethane as the adhesive for laminating saran surfaces to treated polyethylene or polypropylene surfaces, or saran surfaces to saran surfaces, or treated polyethylene or polypropylene surfaces to treated polyethylene and polypropylene surfaces.

The novel adhesives of the present invention have unique and unexpected properties. For instance, while it was previously known that certain water soluble thermoplastic polyurethanes, such as those used in the present invention, are excellent adhesives for laminating treated polyethylene to itself or to saran surfaces, such water soluble polyurethanes do not provide good adhesion of treated polypropylene to itself or to saran surfaces. It was, therefore, surprising and unexpected that blends of these water soluble polyurethanes with minor amounts of a water insoluble terpene polyurethane would provide an adhesive that would bond treated polypropylene to itself or to saran. The results are even more surprising in view of the fact that the terpene polyurethane alone is not a good adhesive for laminating treated polypropylene to itself or to saran surfaces. The novel adhesive composition is, therefore, an important feature of the invention.

Another important embodiment of the invention is a heat-sealable, essentially moisture-proof and grease-proof laminated film structure comprised of a layer or film of treated polyethylene or polypropylene laminated to a preformed substrate layer or sheet of saran or saran coated substrate such as saran coated cellophane, saran coated polyester, saran coated nylon, or saran coated polypropylene, wherein the laminating adhesive is a blend of (a) an essentially thermoplastic polyurethane prepared from polyurethane forming reactants, using conventional catalysts wherein at least one of the reactants contains a tertiary nitrogen atom which imparts sufficient basicity to the polymer to enable it to form water soluble salts with carboxylic acids and (b) a minor amount of a terpene polyurethane which is insoluble in water.

The thermoplastic water soluble polyurethane is a polyether polyurethane and is prepared from a polyalkylene glycol, a diisocyanate, and an N-phenyl or N-alkyl-dialkanolamine. Preferably a difunctional chain extender reactant will be included as a reactant, such as a glycol or an alkylene diamines. An alkylene diamine chain extender is preferred.

Although polypropylene glycol having a molecular weight of 400 to 4000 is preferred as the polyalkylene glycol component because of econimics and better properties, other polyalkylene glycols, especially polyethylene, can be used in preparing polyurethanes that are operable in the invention.

The diisocyanates useful in preparing the thermoplastic polyether urethanes used in the present invention are those conventionally used in preparing polyurethane resins and include, for instance, methylene diphenyl isocyanate, toluene diisocyanate, hexamethylene diisocyanate, isophorone diisocyanate and hydrogenated methylene diphenyl isocyanate. The aliphatic diisocyanates, such as hexamethylene diisocyanate, isophorone diisocyanate, and the hydrogenated aromatic diisocyanates, such as hydrogenated methylene diphenyl isocyanate, are preferred where light stability is important.

The N-alkyl dialkanol amine reactants useful in preparing the thermoplastic polyurethane comprise such reactants in which the alkyl group is a lower alkyl group, i.e., an alkyl group containing 1 to 6 carbon atoms and the alkanol groups contain 1 to 4 carbons. The alkyl group may be a straight chain alkyl group, a branched chain alkyl group or a cyclo-aliphitic hydrocarbon group. A preferred N-alkyl dialkanol amine is N-methyl diethanol amine which is preferred for economic reasons as well as for overall optimization of properties.

The preferred chain extender, when used, is an aliphatic diamine such as ethylene diamine, propylene diamine, butylene diamine and hexamethylene diamine or an alkanol amine such as ethanol amine. Ethylene diamine is especially preferred.

Polyether polyurethanes useful in the invention are prepared by reacting the desired N-phenyl or N-alkyl dialkanol amine and polyether diol with an excess of the desired diisocyanate, up to an NCO to OH ratio of 10:1 excess of diisocyanate on a molar basis being used. The reaction preferably is carried out in a volatile inert water miscible organic solvent such as water miscible ketones, ethers and esters. Methyl ethyl ketone is especially preferred. The reaction is continued, by heating to the reflux temperature of the solvent if desired, until reaction is complete as indicated by a substantially constant isocyanate (NCO) assay. At this point the polyurethane may be capped, or terminated, by reacting the remaining isocyanate groups with a monofunctional lower alcohol, such as isopropanol, but in most cases the polyurethane polymer which still contains isocyanate groups is preferably chain extended with an alkylene diamine to obtain a preferred molecular size and the resulting chain extended polyurethane which still contains some unreacted isocyanate groups is capped with excess isocyanate reactant such as water miscible alcohol, hydroxycarboxylic acid, or water.

For polyether polyurethanes to be useful in the present invention, it is necessary that they contain 2.0% to 8.0% by weight, preferably 3 to 5% by weight, of nitrogen derived from isocyanate groups. In general the higher percentages of nitrogen produce harder polymers while the lower percentages of nitrogen produce softer polymers. Polymers containing 3 to 5% by weight of isocyanate derived nitrogen and 0.75 to 1.5% by weight of tertiary amine derived nitrogen are preferred because they provide the most desirable combination of adhesive bond strength. Generally the reaction of the prepolymer containing isocyanate groups with the diamine chain extender is carried out at on the order of 25° to 70°C. The reaction is carried out stepwise to avoid variations in molecular weight from batch to batch. Ordinarily the desired degree of chain extension will be achieved when an isocyanate assay of about 0.005 to 0.20 milliequivalents of NCO per gram of solution at 50% by weight solids is obtained. Isocyanate assay is determined on a small sample of the reaction mixture by reacting the isocyanate with excess dibutyl amine, back titrating the excess amine with acid and then calculating the milliequivalents of NCO after correcting for the amount of tertiary amine groups in the polymer.

The amount of N-phenyl dialkanol amine or N-lower alkyl dialkanol amine used in the polymer can be sufficient to produce a polymer containing on the order of 0.5 to 2.5% by weight, of tertiary nitrogen, or enough to make the polymer soluble in aqueous acidic solutions. Ordinarily salts of the polymer become soluble in water when the polymer contains at least about 0.5% by weight of tertiary nitrogen. The upper limit of tertiary nitrogen content is not critical for water solubility as the salt but for optimum properties for use in the present invention it is preferred that the upper limit of tertiary nitrogen content should not exceed about 2.5% by weight of the polymer.

When the polymer size that is desired has been obtained, preferably by chain extension as described herein above, and a polymer having an isocyanate assay on the order of 0.005 to 0.20, preferably 0.07 to 0.1, milliequivalents of NCO preferably 0.07 to 0.1, milliequivalents of NCO is obtained the polymer is capped, or terminated by reacting the remaining isocyanate groups with an excess of isocyanate reactant, preferably a water miscible alcohol, e.g., isopropanol, ethanol, water, lactic acid, etc. Any large excess of the water miscible alcohol solvent that is added as the isocyanate reactant to terminate or cap the polymer may also serve as a solvent for the polymer.

The prereacted, capped, thermoplastic polyether urethane is converted to a water soluble salt by reacting with the appropriate amount of an acid. Although acids in general, both organic acids and mineral acids, are effective to solubilize the polymer, the preferred acids to use are the substantially non-toxic organic carboxylic acids, especially acids that have been approved by the Food and Drug Administration for use in foods and food packaging. Lactic acid is such an acid and is very suitable for use in the present invention. Although the upper limit of the amount of acid to use is not particularly critical, it has been found that the lower limit is critical and that at least about 75% of the theoretical amount required to neutralize the polymer must be used to solubilize it. Increasing the amount of acid above the minimum required to solubilize the polymer tends to increase the viscosity of the solution and thus provides a convenient means of regulating the viscosity for application purposes.

An adhesive composition in accordance with the invention is prepared by mixing the solution of the salt of the polyurethane as described above with a solution of the desired amount of water-insoluble terpene polyurethane resin, i.e., 0.2 to 1 part by weight of terpene polyurethane resin, preferably 0.5 part, for each part by weight of water soluble polyurethane. Preferably the terpene polyurethane resin will be dissolved in a water miscible, volatile solvent such as a lower alcohol or ester. For convenience in handling, and economy in shipping, the adhesive composition preferably is prepared as a 30% solids solution, or higher. For application it may be diluted to the concentration and viscosity which is desired for the particular application.

The terpene-urethane resins, or terpene polyurethane resins, as used herein refers to resins made by reaction of terpene alcohols with polyisocyanates, especially diisocyanates. Such resins are available commercially and are described in the prior art. In the present invention we especially prefer a product that is described by the supplier as a terpene-urethane resin, soluble in aromatic and aliphatic hydrocarbons, esters and chlorinated hydrocarbons, having limited solubility in alcohols and ketones, having a color of 1 (Gardner Scale), a specific gravity of 0.95 – 1.05 and a melting point of 95°C ± 5°C.

The following Examples in which the parts are by weight are given to further illustrate the invention:

EXAMPLE 1

A reaction mixture consisting of:

| | Parts |
|---|---|
| Polypropylene glycol, M.W. of 1007, Hydroxyl No. 108 | 483 |
| N-Methyl diethanolamine | 64.4 |
| Toluene diisocyanate | 195 |
| Dibutyltin dilaurate (catalyst) | 0.35 |
| Methyl ethyl ketone | 743.0 | was heated at reflux until an NCO assay of between 0.13 and 0.16 was obtained. At this point the temperature was reduced to 60°–65°C. and a calculated amount of ethylene diamine was added to lower the NCO assay value to 0.07 milliequivalents per gram. The calculation of the amount of ethylene diamine was made as follows:

Grams ethylene diamine required = (milliequivalents of NCO per gram − 0.07) × batch weight in grams × Mol. Weight of ethylene diamine/2000.

Reaction between the ethylene diamine and isocyanate prepolymer is rapid and is assumed to be complete within a few minutes after which time 1060 parts of methyl ethyl ketone and 82.5 parts of lactic acid (88% technical grade) was added and the reaction mixture cooled to room temperature. The resulting chain extended polyether polyurethane resin solution contains 30% solids by weight. An adhesive is prepared by dissolving a terpene-urethane in a diluted solution of the above chain extended polyether polyurethane as follows:

| | Parts |
|---|---|
| 30% Solution of polyether polyurethane | 500 |
| Methyl ethyl ketone | 175 |
| Iso-terp 95 resin | 75 | and then diluting the solution with 750 parts of methyl ethyl ketone. The resulting adhesive contains 15% by weight solids and is of suitable viscosity for application by gravure roll. It was applied to saran film or to saran coated cellophane, or treated polyethylene, or treated polypropylene surface at a rate of approximately 0.5 pounds/ream (3,000 square feet); the solvent is evaporated, and the adhesive coated surface is then adhered to the desired surface such as treated polyethylene or polypropylene, or saran, by conventional laminating techniques to give packaging laminate films having ultimate bond strengths immediately at the end of the laminator. Immediate ultimate bond strengths on the order of 350 to 600 grams are easily obtainable even when laminating a saran surface to a polypropylene surface.

Bond strengths as used in the present application are measured on an Amthor Tensile Tester, Type 272 (available from Amthor Testing Instrument Co., 45–53 Van Sinderen Avenue, Brooklyn, New York) and is the force, in grams, required to separate the laminate using a one-inch wide strip of laminate and a jaw separation rate of 12 inches per minute. Initial bond strength of at least 350 grams is required for a satisfactory laminate. If lower bond strengths are obtained, it indicates that all solvents were not removed from the adhesive film prior to lamination. In such cases, it is only necessary to adjust the drying ovens to ensure complete removal of solvents. Drying temperatures on the order of 100° to 220° are preferred.

EXAMPLE 2

A reaction mixture consisting of:

| | Parts |
|---|---|
| Polypropylene glycol (as in Example 1) | 523 |
| N-Methyl diethanolamine | 81.5 |
| Hydrogenated methylene diphenyl isocyanate (e.g. Hylene W) | 356.5 |
| Dibutyltin dilaurate (catalyst) | .48 |
| Methyl ethyl ketone | 961 | was heated at reflux until a constant NCO assay of 0.141 was obtained. A calculated amount of ethylene diamine, sufficient to lower the NCO assay to 0.07 milliequivalents/gram of 50% solution, and then 105 parts of an 88% lactic acid solution in water was added and the reaction mixture was stirred for 15 minutes. Then 1414 parts of isopropanol was added to form a clear solution of resin, 30% solids by weight, having a viscosity of 250–700 centipoises at 25°C. The polymer contains 3.95% by weight of N derived from isocyanate and 1% by weight of tertiary N. An adhesive composition is prepared by dissolving a terpene-urethane in a diluted solution of the chain extened polyether polyurethane as follows:

| | Parts |
|---|---|
| 30% Solution of polyether polyurethane | 500 |
| Methyl ethyl ketone | 175 |
| Iso-terp 95 resin | 75 | and then diluting the solution with 750 parts of a blend of equal parts by weight of methyl ethyl ketone and isopropanol. The resulting composition is used as an adhesive in a manner similar to Example 1 to form laminates having bond strengths of more than 350 grams.

What is claimed is:

1. An adhesive composition consisting essentially of a volatile, water-miscible, organic solvent solution of a mixture of a minor amount of a terpene urethane resin which is the reaction product of a terpene alcohol with a polyisocyanate, and a major amount of a water soluble salt of a substantially linear thermoplastic polyurethane containing 0.5 to 2.5% by weight of nitrogen derived from tertiary amine groups and from 2 to 8% of nitrogen derived from isocyanate groups, said polyurethane being prepared by (a) reacting an excess of an isocyanate with a mixture of diols consisting of polyether diols having a molecular weight of from 425 to 4,000 and tertiary amine diols selected from the group consisting of N-phenyl dialkanol amine and N-lower alkyl dialkanol amines to obtain a reaction product having free isocyanate groups greater than 0.1 milliequivalents of NCO per gram of solution at 50% solids, (b) chain extending the reaction product with a chain extender selected from the group consisting of alkanol amines and alkylene diamines to obtain a chain extended polyurethane polymer containing from 0.07 to 0.01 milliequivalents of NCO per gram of 50% solution, (c) reacting the free isocyanate groups with a material selected from the group consisting of water miscible alcohols, water miscible acids and water, an amount of a water miscible acid being added sufficient to form the acid salts of the tertiary amine groups present on the polyurethane.

2. An adhesive as in claim 1 wherein the polyether diol is polypropylene glycol, the N-lower alkyl dialkanol amine is N-methyl diethanol amine and the acid is a non-toxic organic carboxylic acid.

3. An adhesive as in claim 1 wherein the polyurethan is reacted with an excess of a water soluble alcohol and the acid is a non-toxic organic carboxylic acid.

4. An adhesive as in claim 3 wherein the water soluble alcohol is isopropanol.

5. An adhesive as in claim 1 wherein the percentage of isocyanate derived nitrogen of the polyether polyurethane is 3 to 5% by weight and the tertiary nitrogen is 0.75 to 1.5% by weight.

6. An adhesive as in claim 5 wherein the polyether diol is propylene glycol, the N-lower alkyl dialkanol amine is N-methyl diethanol amine, chain extender is ethylene diamine, and the free isocyanate remaining after reaction with the chain extender is reacted with isopropanol.

* * * * *